United States Patent [19]
Chavez

[11] Patent Number: 6,044,801
[45] Date of Patent: Apr. 4, 2000

[54] LASSO WITH RELEASE MECHANISM

[76] Inventor: Paul Chavez, P.O. Box 1177, Gallup, N.Mex. 87305

[21] Appl. No.: 09/036,414

[22] Filed: Mar. 5, 1998

[51] Int. Cl.[7] .................................................. A01K 27/00
[52] U.S. Cl. ............................................................ 119/805
[58] Field of Search .................... 54/1; 119/772, 119/776, 805; 24/115 F

[56] References Cited

U.S. PATENT DOCUMENTS

| | | | |
|---|---|---|---|
| 2,530,031 | 11/1950 | Rudolph | 119/805 |
| 3,733,530 | 5/1973 | Labart et al. | 54/1 X |
| 5,771,668 | 6/1998 | Younger | 54/1 |

FOREIGN PATENT DOCUMENTS

| | | | |
|---|---|---|---|
| 1237458 | 6/1960 | France | 54/805 |

*Primary Examiner*—Robert P. Swiatek

[57] ABSTRACT

A lasso release mechanism including a lasso having a free first end and a second end having a eyelet formed therein. The eyelet is adapted for slidably receiving a remaining portion of the lasso thereby affording a loop. The lasso is slit to define a pair of terminations. Also included is a locking mechanism connected between the terminations of the lasso for releasing the same upon the receipt of a signal via free space.

4 Claims, 2 Drawing Sheets

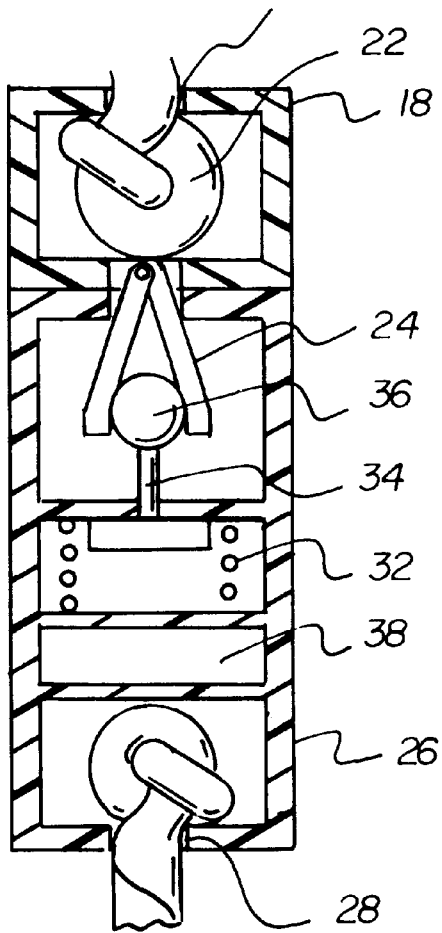
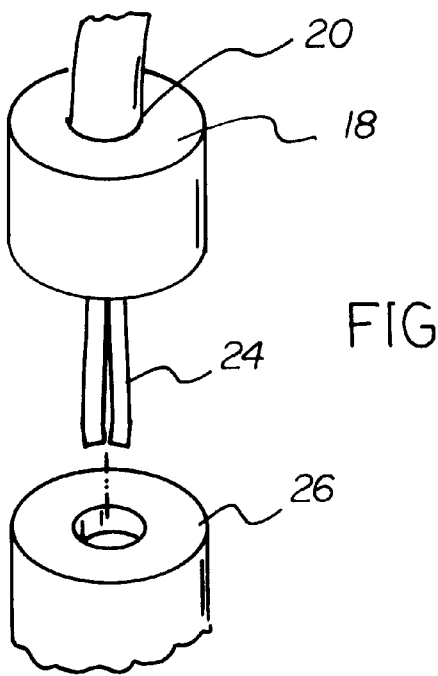

LASSO WITH RELEASE MECHANISM

BACKGROUND OF THE INVENTION

1. Field of the Invention

The present invention relates to release mechanisms and more particularly pertains to a new lasso with release mechanism for releasing a lasso from afar.

2. Description of the Prior Art

The use of release mechanisms is known in the prior art. More specifically, release mechanisms heretofore devised and utilized are known to consist basically of familiar, expected and obvious structural configurations, notwithstanding the myriad of designs encompassed by the crowded prior art which have been developed for the fulfillment of countless objectives and requirements.

Known prior art release mechanisms include U.S. Pat. No. 4,928,634; U.S. Pat. No. 4,121,319; U.S. Pat. No. 4,562,793; U.S. Pat. No. 3,094,755; U.S. Pat. No. 1,463,456; and Foreign Patents EP 0 280 114 A2 and WO 85/00030.

In these respects, the lasso with release mechanism according to the present invention substantially departs from the conventional concepts and designs of the prior art, and in so doing provides an apparatus primarily developed for the purpose of releasing a lasso from afar.

SUMMARY OF THE INVENTION

In view of the foregoing disadvantages inherent in the known types of release mechanisms now present in the prior art, the present invention provides a new lasso with release mechanism construction wherein the same can be utilized for releasing a lasso from afar.

The general purpose of the present invention, which will be described subsequently in greater detail, is to provide a new lasso with release mechanism apparatus and method which has many of the advantages of the release mechanisms mentioned heretofore and many novel features that result in a new lasso with release mechanism which is not anticipated, rendered obvious, suggested, or even implied by any of the prior art release mechanisms, either alone or in any combination thereof.

To attain this, the present invention generally comprises a lasso having a free first end and a second end having an eyelet formed therein. The eyelet is adapted for slidably receiving a remaining position of the lasso thereby affording a loop. The loop is slit to define a pair of terminations. Next provided is a pin housing having a cylindrical configuration. As shown in FIG. 3, the pin housing is equipped with an inboard end having a bore concentrically formed therein. The bore of the pin housing is adapted for receiving a first termination of the loop of the lasso having a knot formed thereon. This knot resides within the pin housing for precluding its removal. The pin housing further includes an outboard end with a pair of locking pins. Such pins have inboard ends pivotally coupled to the pin housing about a common axis. The locking pins have arcuate outboard ends which are spring biased together. Further provided is a receiver housing having a cylindrical configuration. Similar to the pin housing, the receiver housing is equipped with an inboard end having a bore concentrically formed therein for receiving a second termination of the loop. The second termination of the loop has a knot formed thereon which resides within the receiver housing. For reasons that will soon become apparent, an outboard end of the receiver housing has a bore concentrically formed therein. The receiver housing further includes a solenoid. The solenoid has a transducer with a ball formed on an outboard end thereof. The transducer has a first unbiased orientation with the ball situated adjacent to the outboard end of the receiver housing. The ball is adapted for engaging the locking pins upon the insertion of the locking pins within the bore of the outboard end of the receiving housing. The transducer further has a second biased orientation situated distant the outboard end of the receiving housing upon the actuation thereof. In such orientation, the removal of the ball from the locking pins is effected thereby releasing the terminations of the loop of the lasso. Situated within the receiver housing is a receiver. The receiver is connected to the solenoid for actuating the same upon the receipt of an activation signal via free space. Associated therewith is a portable hand held remote control having a push button situated thereon. The remote control serves for transmitting the activation signal via free space upon the depression of the push button.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursor inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lasso with release mechanism apparatus and method which has many of the advantages of the release mechanisms mentioned heretofore and many novel features that result in a new lasso with release mechanism which is not anticipated, rendered obvious, suggested, or even implied by any of the prior art release mechanisms, either alone or in any combination thereof.

It is another object of the present invention to provide a new lasso with release mechanism which maybe easily and efficiently manufactured and marketed.

It is a further object of the present invention to provide a new lasso with release mechanism which is of a durable and reliable construction.

An even further object of the present invention is to provide a new lasso with release mechanism which is susceptible of a low cost of manufacture with regard to both materials and labor, and which accordingly is then susceptible of low prices of sale to the consuming public, thereby making such lasso with release mechanism economically available to the buying public.

Still yet another object of the present invention is to provide a new lasso with release mechanism which provides in the apparatuses and methods of the prior art some of the advantages thereof, while simultaneously overcoming some of the disadvantages normally associated therewith.

Still another object of the present invention is to provide a new lasso with release mechanism for releasing a lasso from afar.

Even still another object of the present invention is to provide a new lasso with release mechanism that includes a lasso having a free first end and a second end having an eyelet formed therein. The eyelet is adapted for slidably receiving a remaining portion of the lasso thereby affording a loop. The lasso is slit to define a pair of terminations. Also included is a locking mechanism connected between the terminations of the lasso for releasing the same upon the receipt of a signal via free space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the housings of the present invention taken along line 3—3 shown in FIG. 2.

FIG. 4 is an exploded perspective view of the housings of the present invention.

DESCRIPTION OF THE PREFERRED EMBODIMENT

Figure 1:
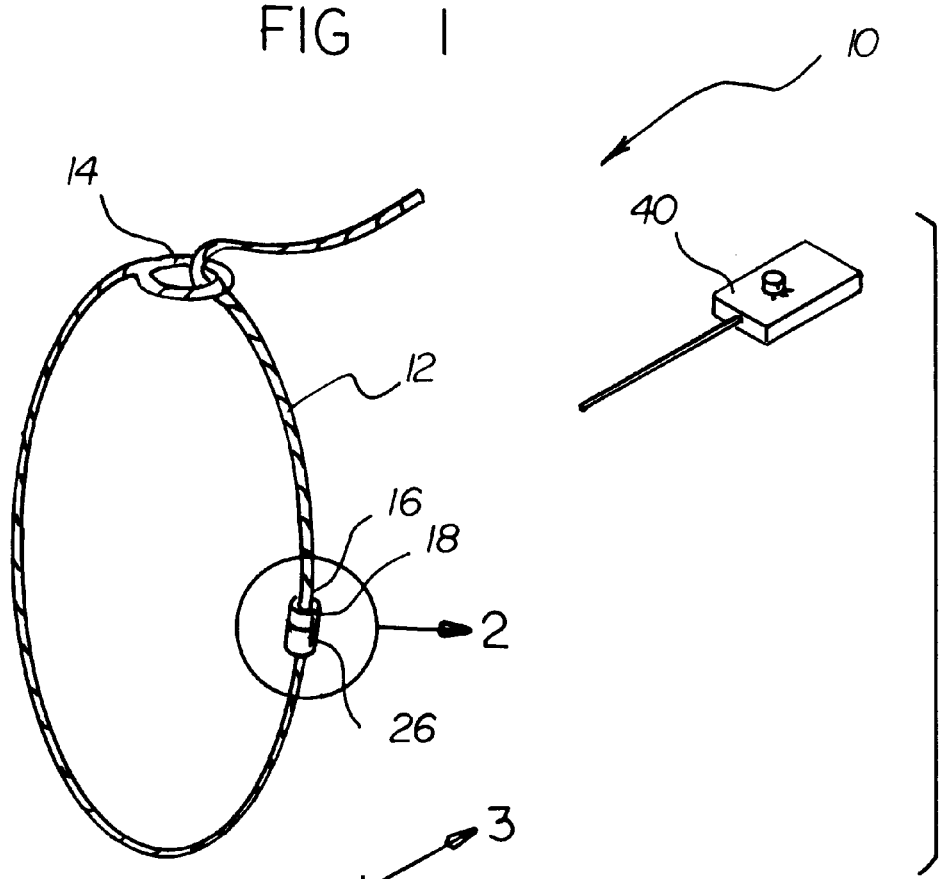
FIG. 1 is a perspective view of a new lasso with release mechanism according to the present invention.
Figure 2:
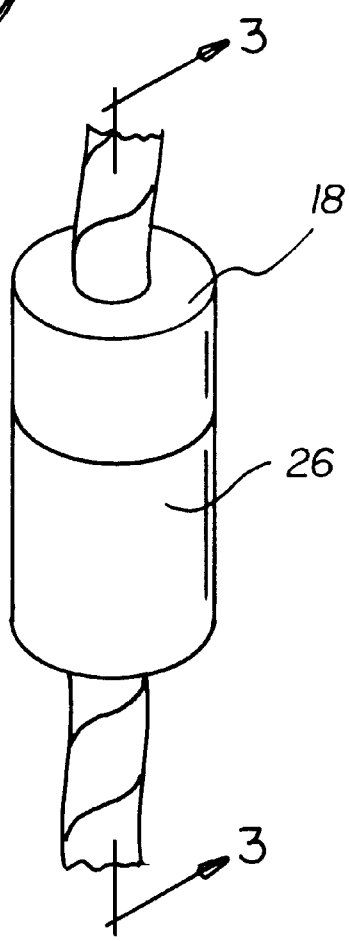
FIG. 2 is a close-up perspective view of the housings of the present invention.

With reference now to the drawings, and in particular to FIGS. 1 through 4 thereof, a new lasso with release mechanism embodying the principles and concepts of the present invention and generally designated by the reference numeral 10 will be described.

The present invention, designated as numeral 10, includes a lasso 12 having a free first end and a second end having an eyelet 14 formed therein. The eyelet is adapted for slidably receiving a remaining portion of the lasso thereby affording a loop. The loop is slit to define a pair of terminations 16. Such slit is preferably situated adjacent to the second end of the lasso.

Next provided is a pin housing 18 having a cylindrical configuration. As shown in FIG. 3, the pin housing is equipped with an inboard end having a bore 20 concentrically formed therein. The bore of the pin housing is adapted for receiving a first termination of the loop of the lasso having a knot 22 formed thereon. This knot resides within the pin housing for precluding its removal.

The pin housing further includes an outboard end with a pair of locking pins 24. Such pins have inboard ends pivotally coupled to the pin housing about a common axis. The locking pins have arcuate outboard ends which are spring biased together. This is preferably accomplished by way of an unillustrated spring mounted between the pins.

Further provided is a receiver housing 26 having a cylindrical configuration. Similar to the pin housing, the receiver housing is equipped with an inboard end having a bore 28 concentrically formed therein for receiving a second termination of the loop. The second termination of the loop has a knot formed thereon which resides within the receiver housing. For reasons that will soon become apparent, an outboard end of the receiver housing has a bore 30 concentrically formed therein.

The receiver housing further includes a solenoid 32 situated therein. The solenoid has a transducer 34 with a ball 36 formed on an outboard end thereof. For reasons that will become apparent, it is imperative that the bore 30 have a diameter which is less than that of the ball 36.

In use, the transducer has a first unbiased orientation with the ball situated adjacent to the outboard end of the receiver housing. The ball is adapted for engaging the locking pins upon the insertion of the locking pins within the bore of the outboard end of the receiver housing. The arcuate nature of the pins and ball allow the pins to slide to diametrically opposed sides of the ball when inserted. Note FIG. 3. The transducer further has a second biased orientation situated distant the outboard end of the receiving housing upon the actuation thereof. In such orientation, the removal of the ball from the locking pins is effected thereby releasing the terminations of the loop of the lasso.

Situated within the receiver housing is a receiver 38. The receiver is connected to the solenoid for actuating the same upon the receipt of an activation signal via free space. It should be noted that the knot, receiver and solenoid of the receiver housings are each separated via dividers. Associated therewith is a portable hand held remote control 40 having a push button situated thereon. The remote control serves for transmitting the activation signal via free space upon the depression of the push button.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationship for the parts of the invention, to include variations and size, materials, shape, form, function and manner of operation, assembly and use, are deemed readily apparent and obvious to one skilled in the art, and all equivalent relationship to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lasso release mechanism comprising, in combination:

a lasso including a free first end and a second end having an eyelet formed therein for slidably receiving a remaining portion of the lasso thereby affording a loop, wherein the loop is slit to define a pair of terminations;

a pin housing having a cylindrical configuration with an inboard end having a bore concentrically formed therein for receiving a first termination of the loop of the lasso having a knot formed thereon which resides within the pin housing for precluding its removal, the pin housing further including an outboard end with a pair of locking pins having inboard ends pivotally coupled to the pin housing about a common axis, the locking pins having arcuate outboard ends which are spring biased together;

a receiver housing having a cylindrical configuration with an inboard end having a bore concentrically formed therein for receiving a second termination of the loop having a knot formed thereon which resides within the receiving housing for precluding its removal and an outboard end having a bore concentrically formed therein, the receiver housing further including a solenoid having a transducer with a ball formed on an outboard end thereof, the transducer having a first unbiased orientation with the ball situated adjacent to the outboard end of the receiver housing for engaging the locking pins upon the insertion thereof within the bore of the outboard end of the receiver housing and a second biased orientation situated distant the outboard end of the receiving housing upon the actuation thereof thereby releasing the terminations of the loop of the lasso;

a receiver situated within the receiver housing and connected to the solenoid for actuating the same upon the receipt of an activation signal via free space; and a portable hand held remote control having a push button situated thereon for transmitting the activation signal via free space upon the depression thereof.

2. A lasso release mechanism comprising:

a lasso including a free first end and a second end for slidably receiving a remaining portion of the lasso thereby affording a loop, wherein the lasso is slit to define a pair of terminations;

a locking mechanism connected between the terminations of the lasso for releasing the same upon the receipt of a signal via free space, the locking mechanism having a pin housing and a receiver housing;

the pin housing being for receiving a first of the terminations of the loop, the pin housing having a pair of locking pins being pivotally coupled to the pin housing, the locking pins having outboard ends which are spring biased together; and the receiver housing being for receiving a second of the terminations of the loop, the receiver housing being for releasably engaging the locking pins of the pin housing such that the pin housing is released from the receiver housing to separate the first of the terminations of the loop from the second of the terminations of the loop.

3. A lasso release mechanism as set forth in claim 2 wherein the signal is transmitted via a portable hand held unit.

4. A lasso release mechanism as set forth in claim 2 wherein the lasso is slit along the loop.

* * * * *